(12) United States Patent
Jung et al.

(10) Patent No.: US 8,494,079 B2
(45) Date of Patent: Jul. 23, 2013

(54) METHOD FOR EFFICIENTLY PERFORMING MULTI-BS MIMO OPERATION IN A BROADBAND WIRELESS ACCESS SYSTEM

(75) Inventors: In Uk Jung, Anyang-si (KR); Wook Bong Lee, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 356 days.

(21) Appl. No.: 12/805,810

(22) Filed: Aug. 19, 2010

(65) Prior Publication Data

US 2011/0051826 A1     Mar. 3, 2011

Related U.S. Application Data

(60) Provisional application No. 61/236,843, filed on Aug. 25, 2009, provisional application No. 61/258,574, filed on Nov. 5, 2009.

(30) Foreign Application Priority Data

Apr. 2, 2010    (KR) ................. 10-2010-0030298

(51) Int. Cl.
*H04B 7/02*      (2006.01)
*H04Q 7/30*      (2006.01)
*H04Q 7/32*      (2006.01)

(52) U.S. Cl.
USPC ............. 375/276; 455/456.5; 455/456.6; 455/500

(58) Field of Classification Search
USPC ............. 375/219–222, 259, 267; 370/310, 370/328, 329, 334–336, 342–345, 347; 455/436–439, 444, 455, 456.1–456.6, 500, 455/503, 510, 69, 88
See application file for complete search history.

(56) References Cited

U.S. PATENT DOCUMENTS

| | | | |
|---|---|---|---|
| 2006/0172738 A1* | 8/2006 | Kwon et al. | 455/439 |
| 2006/0281461 A1* | 12/2006 | Kwun et al. | 455/436 |
| 2008/0214185 A1* | 9/2008 | Cho et al. | 455/424 |
| 2009/0016303 A1* | 1/2009 | Shaik et al. | 370/331 |
| 2009/0207822 A1 | 8/2009 | Kim et al. | |
| 2010/0091739 A1* | 4/2010 | Dayal et al. | 370/332 |
| 2010/0098025 A1* | 4/2010 | Chen et al. | 370/331 |
| 2010/0208695 A1* | 8/2010 | Youn et al. | 370/331 |

OTHER PUBLICATIONS

Jiang et al., "Multicast Broadcast Services Support in OFDMA-Based WiMAX Systems," IEEE Communications Magazine, Aug. 2007, pp. 78-86.
Song et al., "IEEE 802.16 Broadband Wireless Access Working Group, Collaborative MIMO," IEEE C802.16m-07/244r1, Nov. 7, 2007, pp. 1-9.

* cited by examiner

*Primary Examiner* — Young T. Tse
(74) *Attorney, Agent, or Firm* — Birch, Stewart, Kolasch & Birch, LLP

(57) ABSTRACT

A method for determining temporary Base Station (BS) Identifiers (IDs) to efficiently set a multi-BS Multiple Input Multiple Output (MIMO) transmission mode and an apparatus for implementing the same in a broadband wireless access system are disclosed. To perform a multi-BS MIMO operation, a Mobile Station (MS) receives a first broadcast message including system information about a plurality of neighbor BSs from a serving BS, receives a second broadcast message including BS set information from the serving BS, the BS set information specifying indexes of one or more neighbor BSs which can be involved in the multi-BS MIMO operation among the plurality of neighbor BSs, and determines a temporary BS ID of each BS included in the BS set information using the specified indexes.

16 Claims, 7 Drawing Sheets

--PRIOR ART--

--PRIOR ART--

METHOD FOR EFFICIENTLY PERFORMING MULTI-BS MIMO OPERATION IN A BROADBAND WIRELESS ACCESS SYSTEM

This application claims the benefit of the Korean Patent Application No. 10-2010-0030298, filed on Apr. 2, 2010, which is hereby incorporated by reference as if fully set forth herein.

This application also claims the benefit of U.S. Provisional Application Ser. Nos. 61/258,574, filed on Nov. 5, 2009, and 61/236,843, filed on Aug. 25, 2009, the contents of which are hereby incorporated by reference in their entirety.

BACKGROUND OF THE INVENTION

1. Field of the Invention

The present invention relates to a broadband wireless access system, and more particularly, to a method for determining temporary Base Station (BS) Identifiers (IDs) to efficiently set a multi-BS transmission mode and an apparatus for implementing the same.

2. Discussion of the Related Art

MIMO is short for Multiple Input Multiple Output. Beyond conventional schemes using a single Transmit (Tx) antenna and a single Receive (Rx) antenna, MIMO uses a plurality of Tx antennas and a plurality of Rx antennas to thereby increase the transmission and reception efficiency of data. With the use of multiple antennas at a transmitter or a receiver, MIMO seeks to increase capacity and improve performance in a wireless communication system. The term "MIMO" is interchangeable with "multi-antenna".

The MIMO technology does not depend on a single antenna path to receive an entire message. Rather, it completes the message by combining data fragments received through a plurality of antennas. Because MIMO may increase data rate within a certain area or extend system coverage at a given data rate, it is considered as a promising future-generation mobile communication technology that may find its use in a wide range including mobile terminals, relays, etc. With the growth of data communication, MIMO is attracting attention as a future-generation technology that may overcome a limit on transmission capacity that is almost reached due to the increased data communication.

FIG. 1 illustrates the configuration of a typical MIMO communication system. Referring to FIG. 1, a transmitter has $N_t$ Tx antennas and a receiver has $N_r$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to in proportion to the number of antennas. Therefore, transmission rate and frequency efficiency are increased. Given a maximum transmission rate $R_o$ that may be achieved in case of a single antenna, the increase of channel capacity may increase the transmission rate, in theory, to the product of $R_o$ and $R_i$ in case of multiple antennas. $R_i$ is a transmission rate increase rate.

For instance, a MIMO communication system with four Tx antennas and four Rx antennas may achieve a four-fold increase in transmission rate theoretically, relative to a single-antenna system. Since the theoretical capacity increase of the MIMO system was proved in the middle 1990's, many techniques have been actively studied to increase data rate in real implementation. Some of the techniques have already been reflected in various wireless communication standards for $3^{rd}$ Generation (3G) mobile communications, future-generation Wireless Local Area Network (WLAN), etc.

There are two types of MIMO schemes: spatial diversity and spatial multiplexing. Spatial diversity increases transmission reliability using symbols that have passed in multiple channel paths, whereas spatial multiplexing increases transmission rate by transmitting a plurality of data symbols simultaneously through a plurality of Tx antennas. The advantages of these two schemes may be taken by using them in an appropriate combination.

To describe a communication scheme in a MIMO system in detail, the following mathematical model may be used. It is assumed that there are $N_T$ Tx antennas and $N_R$ Rx antennas as illustrated in FIG. 1. The maximum rank $R_i$ of a channel matrix is given as $$R_i = \min(N_T, N_R) \qquad \text{[Equation 1]}$$

Regarding a transmission signal, up to $N_T$ pieces of information can be transmitted through the $N_T$ Tx antennas, as expressed as the following vector.

$$s = [s_1, s_2, \ldots, s_{N_T}]^T \qquad \text{[Equation 2]}$$

A different transmit power may be applied to each piece of transmission information $s_1, s_2, \ldots, s_{N_T}$. Let the transmit power levels of the transmission information be denoted by $P_1, P_2, \ldots, P_{N_T}$, respectively. Then the power-controlled transmission information ŝ may be given as [Equation 3].

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

ŝ may be expressed as a diagonal matrix P of transmit power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, actual $N_T$ transmitted signals $x_1, x_2, \ldots, x_{N_T}$ may be configured by applying a weight matrix W to the power-controlled information vector ŝ. The weight matrix W functions to appropriately distribute the transmission information to the Tx antennas according to transmission channel statuses, etc. These transmitted signals $x_1, x_2, \ldots, x_{N_T}$ are represented as a vector x, which may be determined as $$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

where $w_{ij}$ denotes a weight for a $j^{th}$ piece of information $\hat{s}_j$ transmitted through an $i^{th}$ Tx antenna and the weights are expressed as the matrix W. W is referred to as a weight matrix or a precoding matrix.

The afore-mentioned transmitted signal x may be considered in two cases: spatial diversity and spatial multiplexing.

In spatial multiplexing, different signals are multiplexed prior to transmission. Accordingly, the elements of the information vector s have different values. In contrast, the same signal is transmitted in a plurality of channel paths in spatial diversity. As a result, the elements of the information vector s have the same value.

Spatial multiplexing and spatial diversity may be used in combination. For example, the same signal may be transmitted through some Tx antennas in spatial diversity, while different signals may be transmitted through the other Tx antennas in spatial multiplexing.

Given $N_R$ Rx antennas, signals received at the Rx antennas, $y_1, y_2, \ldots, y_{N_R}$ may be represented as the following vector.

$$y = [y_1, y_2, \ldots, y_{N_R}]^T \qquad \text{[Equation 6]}$$

When channels are modeled in the MIMO communication system, they may be distinguished according to the indexes of Tx and Rx antennas and the channel between a $j^{th}$ Tx antenna and an $i^{th}$ Rx antenna may be represented as $h_{ij}$. It is to be noted herein that the index of the Rx antenna precedes that of the Tx antenna in $h_{ij}$.

The channels may be represented as vectors and matrices by grouping them. The vector representation of channels may be carried out in the following manner.

FIG. 2 illustrates channels from $N_T$ Tx antennas to an $i^{th}$ Rx antenna.

Referring to FIG. 2, the channels from the $N_T$ Tx antennas to the $i^{th}$ Rx antenna may be expressed as $$h_i^T = [h_{i1}, h_{i2}, \ldots, h_{iN_T}] \qquad \text{[Equation 6]}$$

Also, all channels from $N_T$ Tx antennas to $N_R$ Rx antennas may be expressed as the following matrix.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \qquad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n = [n_1, n_2, \ldots, n_{N_R}]^T \qquad \text{[Equation 9]}$$

From the above modeled equations, the received signal is given as $$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

In the mean time, the numbers of rows and columns in the channel matrix H representing channel statuses are determined according to the numbers of Tx and Rx antennas. The number of rows is identical to that of Rx antennas, $N_R$ and the number of columns is identical to that of Tx antennas, $N_T$. Thus, the channel matrix H is of size $N_R * N_T$.

In general, the rank of a matrix is defined as the minimum of the numbers of independent rows and columns. Accordingly, the rank of the matrix is not larger than the number of rows or columns. For example, the rank of the matrix H, rank(H) is limited as follows.

$$\text{rank}(H) \leq \min(N_T, N_R) \qquad \text{[Equation 11]}$$

If the matrix is eigenvalue-decomposed, its rank may be defined as the number of non-zero eigenvalues. Similarly, in case of Singular Value Decomposition (SVD), the rank may be defined as the number of non-zero singular values. Therefore, the rank of a channel matrix physically means the maximum number of different pieces of information that can be transmitted on given channels.

A different piece of information transmitted in MIMO is referred to as 'transmission stream' or shortly 'stream'. The 'stream' may be called 'layer'. It is thus concluded that the number of transmission streams is not larger than the rank of channels, i.e. the maximum number of different pieces of transmittable information.

The channel matrix H is determined by $$\text{\# of streams} \leq \text{rank}(H) \leq \min(N_T, N_R) \qquad \text{[Equation 12]}$$

where "# of streams" denotes the number of streams. One thing to be noted herein is that one stream may be transmitted through one or more antennas.

One or more streams may be mapped to a plurality of antennas in many ways. The stream-to-antenna mapping may be described as follows depending on MIMO schemes. If one stream is transmitted through a plurality of antennas, this may be regarded as spatial diversity. When a plurality of streams are transmitted through a plurality of antennas, this may be equivalent to spatial multiplexing. Needless to say, a hybrid scheme of spatial diversity and spatial multiplexing in combination may be contemplated.

When the above-described MIMO technology applies to downlink transmission, a plurality of Base Stations (BSs) around a Mobile Station (MS) affect downlink transmission to the MS (downlink multi-BS MIMO). Downlink multi-BS MIMO techniques may be considered in two aspects, joint MIMO processing and single-BS precoding with multi-BS coordination, according to transmission schemes.

In the joint MIMO processing mode, a plurality of BSs transmit the same signal to one MS, whereas the single-BS precoding with multi-BS coordination mode is intended to minimize other BS interference with a signal received from a serving BS in a MIMO environment.

To implement the above MIMO techniques in a broadband wireless access system such as an Institute of Electrical and Electronics Engineers (IEEE) 802.16m system, an MS needs to get knowledge of neighbor BSs that transmit signals through multiple antennas. However, a procedure is yet to be specified, for efficiently acquiring information (e.g. BSIDs) about BSs that are involved in or available for participation in a MIMO operation and requesting MIMO transmission based on the acquired information by an MS.

SUMMARY OF THE INVENTION

An object of the present invention devised to solve the problem lies on a method for efficiently performing a multi-Base Station (BS) Multiple Input Multiple Output (MIMO) operation, and an apparatus for implementing the same.

Another object of the present invention devised to solve the problem lies on a method for efficiently exchanging information about BSs that will be involved in a multi-BS transmission mode, when the multi-BS transmission mode is set, and an apparatus for implementing the same.

It will be appreciated by persons skilled in the art that that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a method for performing a multi-BS MIMO operation at an MS in a broadband wireless access system includes receiving a first broadcast message including system information about a plurality of neighbor BSs from a serving BS, receiving a second broadcast message including BS set information from the serving BS, the BS set information specifying indexes of one or more neighbor BSs which can be involved in the multi-BS MIMO operation among the plurality of neighbor BSs, and determining a temporary BS ID of each BS included in the BS set information using the specified indexes.

The temporary BS IDs may be determined by re-indexing the specified indexes in a predetermined order.

Each of the specified indexes may be 8 bits long, and each of the temporary BS IDs may be 4 bits long.

The method may further include measuring a channel from each of the BSs included in the BS set information using the system information included in the first broadcast message.

The method may further include transmitting a request message to the serving BS, the request message including a temporary BS ID of at least one BS having a channel measurement equal to or larger than a predetermined threshold and a field that indicates a multi-BS MIMO transmission mode requested by the MS.

The first broadcast message may be an Advanced Air Interface Neighbor Advertisement (AAI_NBR-ADV) message, the second broadcast message may be an Advanced Air Interface Downlink Interference Mitigation (AAI_DL-IM) message, and the request message may be an Advanced Air Interface multi-BS MIMO request (AAI_MULTI_BS_MIMO-REQ) message.

In another aspect of the present invention, provided herein is a method for performing a multi-BS MIMO operation at a serving BS in a broadband wireless access system, including broadcasting a first broadcast message including system information about a plurality of neighbor BSs, broadcasting a second broadcast message including BS set information specifying indexes of one or more neighbor BSs which can be involved in the multi-BS MIMO operation among the plurality of neighbor BSs, and receiving a request message requesting multi-BS MIMO transmission from an MS, the request message including at least one of temporary BS IDs determined for BSs included in the BS set information using the specified indexes.

The temporary BS IDs may be determined by re-indexing the specified indexes in a predetermined order.

Each of the specified indexes may be 8 bits long, and each of the temporary BS IDs may be 4 bits long.

The method may further include transmitting a response message to the MS, the response message including a bitmap indicating whether each of BSs corresponding to temporary BS IDs included in the request message is involved in the multi-BS MIMO operation.

The first broadcast message may be an AAI_NBR-ADV message, the second broadcast message may be an AAI_DL-IM message, and the request message may be an AAI_MULTI_BS_MIMO-REQ message.

In a further aspect of the present invention, provided herein is an MS including a processor and a Radio Frequency (RF) module having a plurality of antennas, for transmitting and receiving RF signals to and from an external device under the control of the processor. The processor controls a first broadcast message including system information about a plurality of neighbor BSs to be received from a serving BS, controls a second broadcast message including BS set information to be received from the serving BS, the BS set information specifying indexes of one or more neighbor BSs which can be involved in the multi-BS MIMO operation among the plurality of neighbor BSs, and controls a temporary BS ID of each BS included in the BS set information to be determined using the specified indexes.

The processor may determine the temporary BS IDs by re-indexing the specified indexes in a predetermined order.

Each of the specified indexes may be 8 bits long, and each of the temporary BS IDs may be 4 bits long.

The processor may control a channel from each of BSs included in the BS set information to be measured using the system information included in the first broadcast message.

The processor may control a request message to be transmitted to the serving BS, the request message including a temporary BS ID of at least one BS having a channel measurement equal to or larger than a predetermined threshold and a field that indicates a multi-BS MIMO mode requested by the MS.

The first broadcast message may be an AAI_NBR-ADV message, the second broadcast message may be an AAI_DL-IM message, and the request message may be an AAI_MULTI_BS_MIMO-REQ message.

The embodiments of the present invention have the following effects.

A downlink multi-BS MIMO-mode operation can be efficiently performed in a MIMO environment.

When a multi-BS MIMO mode is set, a short temporary ID is used during exchanging information about BSs participating in the multi-BS MIMO mode. Hence, signaling overhead is reduced.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Figure 1:
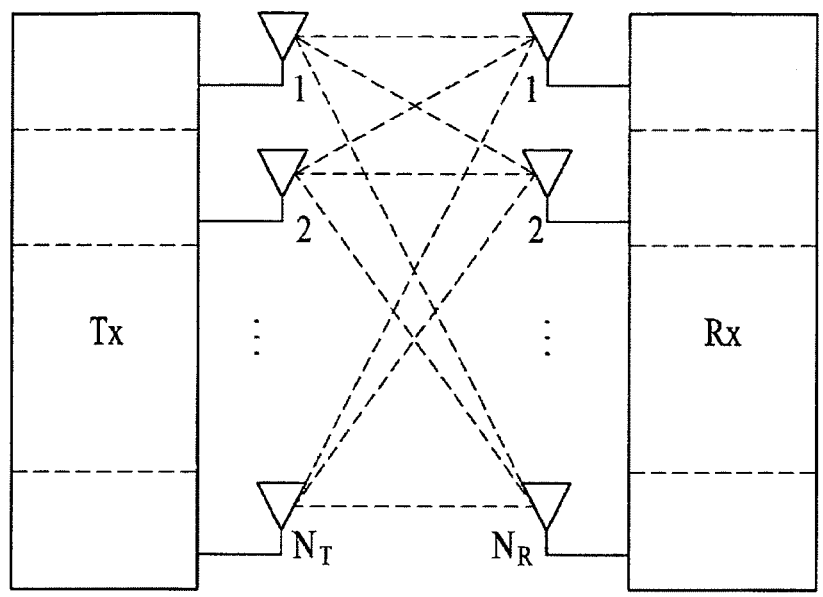
FIG. 1 illustrates the configuration of a typical Multiple Input Multiple Output (MIMO) communication system.
Figure 2:
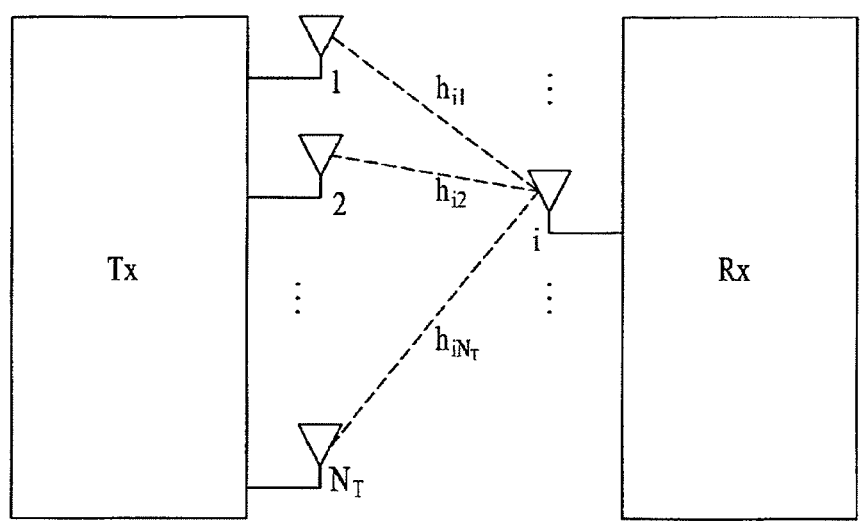
FIG. 2 illustrates channels from $N_T$ Transmit (Tx) antennas to an $i^{th}$ Receive (Rx) antenna.

Exemplary embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In exemplary embodiments of the present invention, a description is made of a data transmission and reception relationship between a Base Station (BS) and a Mobile Station (MS). Herein, the term 'BS' refers to a terminal node of a network, which communicates directly with the MS. In some cases, a specific operation described as performed by the BS may be performed by an upper node of the BS.

Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'eNode B (eNB)', 'access point', 'Advanced Base Station (ABS), etc. The term 'MS' may be replaced with the term 'User Equipment (UE)', 'Subscriber Station (SS)', 'Mobile Subscriber Station (MSS)', 'terminal', 'mobile terminal', 'Advanced Mobile Station (AMS)', etc.

Exemplary embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the exemplary embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

Exemplary embodiments of the present invention are supported by standard documents disclosed for at least one of wireless access systems including an Institute of Electrical and Electronics Engineers (IEEE) 802 system, a $3^{rd}$ Generation Project Partnership (3GPP) system, a 3GPP Long Term Evolution (LTE) system, and a 3GPP2 system. In particular, the steps or parts, which are not described to clearly reveal the technical idea of the present invention, in the embodiments of the present invention may be supported by the above documents. All terminologies used herein may be supported by at least one of P802.16-2004, P802.16e-2005, P802.16Rev2, and P802.16m documents which are the standards of IEEE 802.16.

Specific terms used for the exemplary embodiments of the present invention are provided to help the understanding of the present invention. These specific terms may be replaced with other terms within the scope and spirit of the present invention.

A detailed description will be made of downlink MIMO transmission schemes.

It is known that closed-loop MIMO improves cell-edge throughput as well as average user throughput in a multi-cell environment. Nevertheless, an MS at a cell edge is still vulnerable to interference from neighbor cells. Therefore, the MS measures signals from the neighbor cells and reports Precoding Matrix Indexes (PMIs) with the least interferences to a serving BS, so as to recommend the PMIs to the neighbor cells. Alternatively, the MS reports PMIs with the largest interferences to the serving BS so as to restrict use of the PMIs in the neighbor cells. Under this MIMO environment, a relationship between signals and interference during communication between an MS and a plurality of BSs will be described below with reference to FIG. 3.

Figure 3:
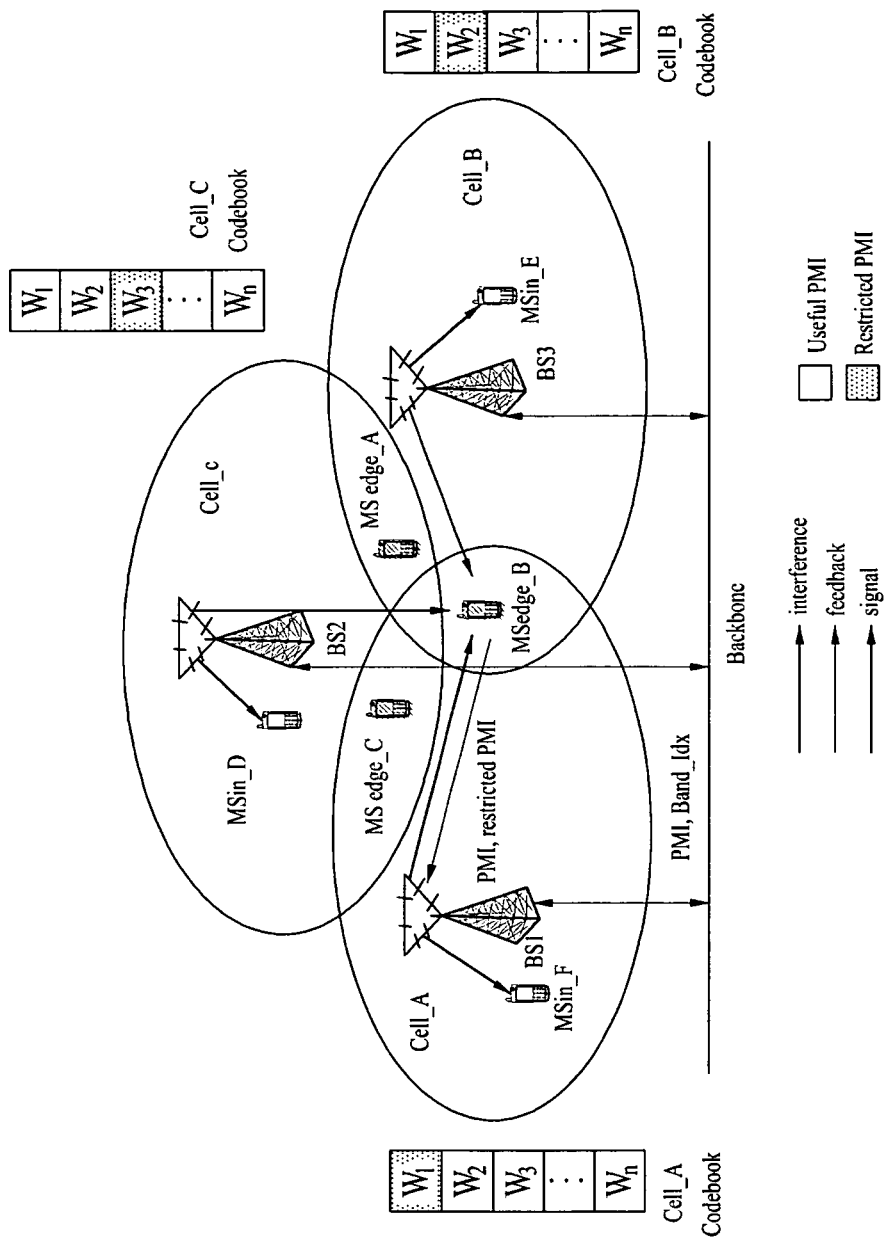
FIG. 3 illustrates a relationship between signals and interference during communications between a Mobile Station (MS) and a plurality of Base Stations (BSs) in a MIMO environment.

Referring to FIG. 3, it is assumed that all BSs are connected to one another via a backbone network and use the same codebook. Recommended or restricted PMIs are shown as shaded.

An MS, MSedge_B is located at an edge of a cell Cell_A, affected by neighbor cells Cell_B and Cell_C. Other MSs, MSin_D, MSin_E and MSin_F which receive relatively high-power signals are near to the centers of cells. According to the PMI recommendation/restriction technique, the MS, MSedge_B measures interference from interfering BSs BS_2 and BS_3, determines best PMIs for the interfering BSs BS_2 and BS_3, and reports them to a serving BS BS_1. Hence, the serving BS BS_1 notifies the neighbor cells of the reported PMIs over the backbone network.

When the second BS, BS_2 within a cell Cell_C receives the PMI information from the serving BS, BS_1, it uses the PMI indicated by the PMI information in case of PMI recommendation or does not use the PMI in case of PMI restriction.

The PMI recommendation/restriction technique has been described above with reference to FIG. 3 on the premise that there is one serving BS for an MS in a multi-cell environment. Yet, MIMO transmission of the present invention covers even downlink multi-BS transmission. Downlink multi-BS MIMO schemes may include single-BS precoding with multi-BS coordination, Closed-Loop Macro Diversity (CL-MD), and Joint MIMO Processing (JP).

In the CL-MD mode, an MS receives downlink signals from two or more BSs and feeds back best PMIs for downlink transmission to the BSs in a closed-loop. The JP mode will be described with reference to FIG. 4.

Figure 4:
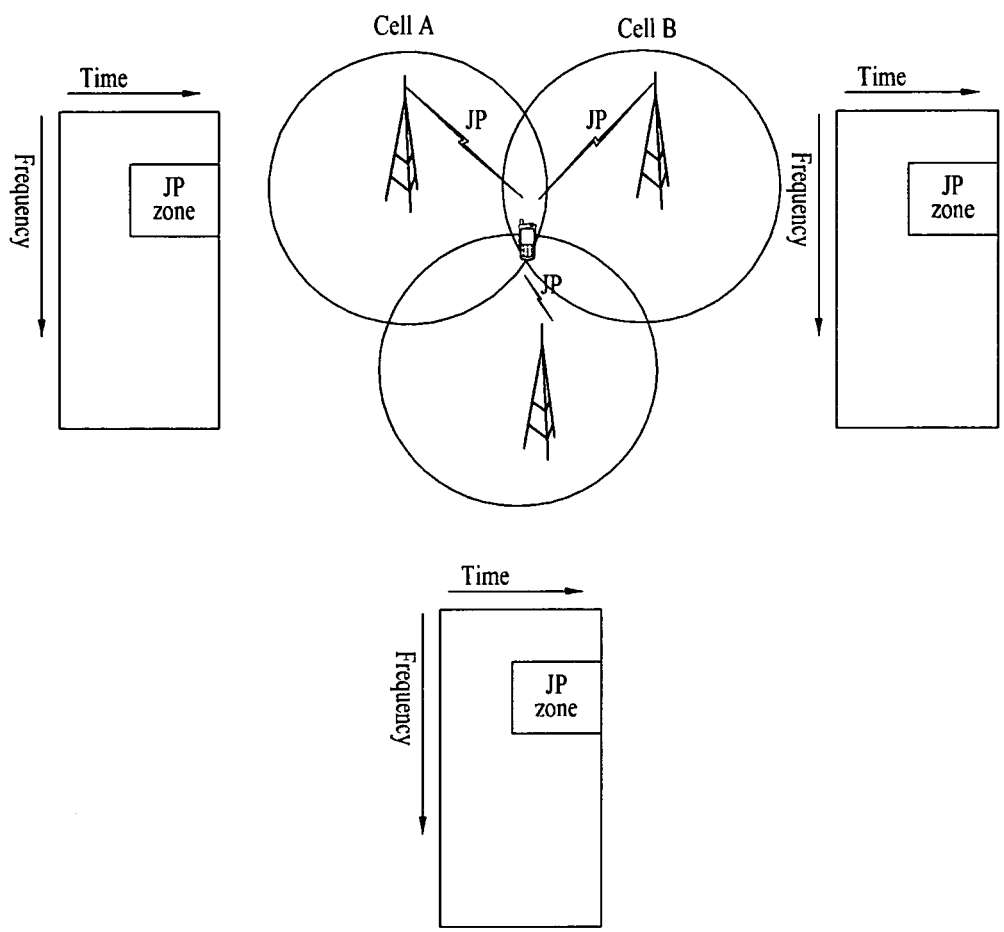
FIG. 4 illustrates an example of a joint MIMO processing scheme.

FIG. 4 illustrates an example of the joint MIMO processing scheme.

Referring to FIG. 4, an MS receives signals from Cell A, Cell B and Cell C in resources allocated for joint processing, that is, in resources defined by a predetermined time and frequency (a JP zone), thus having a spatial diversity effect. While all BSs involved in the JP mode use the same resources in FIG. 4, the present invention is also applicable to a case where each BS uses different resources.

For implementation of the above-described downlink multi-BS MIMO transmission scheme (the single-BS precoding with multi-BS coordination mode, the CL-MD mode, or the JP mode) is implemented in an IEEE 802.16m system, an AMS may acquire information about neighbor ABSs that can be involved in the downlink multi-BS MIMO transmission mode and measure the channel states of the neighbor ABSs. The AMS may then report a list of preferred ABSs based on the measurements to a serving ABS and request data transmission in the downlink multi-BS MIMO transmission mode to the serving BS. The serving BS may determine ABSs that will be involved in the downlink multi-BS MIMO transmission mode based on the report received from the AMS and notify the AMS of a list of the determined ABSs. For the convenience' sake, a set of ABSs that are available for a downlink multi-BS MIMO operation will be referred to as a diversity set.

When acquiring information about the diversity set, the AMS may exchange information required for implementation of the downlink multi-BS MIMO transmission mode (the single-BS precoding with multi-BS coordination mode, the CL-MD mode, or the JP mode) such as a PMI feedback with the serving ABS by predetermined Medium Access Control (MAC) messages.

Specifically, the AMS may acquire information about neighbor BSs from an Advanced Air Interface Neighbor Advertisement (AAI_NBR-ADV) message broadcast from the serving ABS. The AAI_NBR-ADV message carries 48-bit full Identifiers (IDs, i.e. BSIDs) of the neighbor ABSs, which are indexed in 8 bits within the message. To request the downlink multi-BS MIMO transmission mode and to determine ABSs that will be involved in the downlink multi-BS MIMO transmission mode, each of MAC management messages exchanged between the AMS and the serving BS includes a list of ABSs that are available for or will be involved in the downlink multi-BS MIMO transmission mode. The BS list needs to be efficiently included in the MAC management messages in order to reduce signaling overhead.

Despite an already determined diversity set, if a BS list is included using 8 bits per BS in a MAC message as in an AAI_NBR-ADV message, the BS list occupies 8n bits (n is the number of ABSs listed in the BS list). As a result, a large signaling overhead may be caused.

Accordingly, there exists a need for efficiently identifying each ABS in a BS list included in a downlink multi-BS MIMO transmission-related MAC message that the AMS or the serving ABS transmits in the multi-cell environment. To this end, additional shorter BSIDs are used, which the AMS may implicitly acquire from the diversity set in the present invention.

For the convenience' sake, the additional BSIDs are referred to as a "temporary BSIDs (Temp_BSID)".

According to the present invention, the AMS may acquire temporary BSIDs implicitly from the diversity set. Therefore, the AMS needs to acquire the diversity set by a specific MAC message, first of all.

Table 1 below lists parameters that may be included in an Advanced Air Interface Downlink Interference Mitigation (AAI_DL-IM) message.

TABLE 1

| M/O | Attributes/Array of attributes | | Size (bits) | Value/Note | Conditions |
|---|---|---|---|---|---|
| M | Control Message Type | | 8 | Type of AAI_DL-IM | N.A. |
| O | diversitySetNum | | 4 | The number of ABSs coordinating with the serving ABS for single BS precoding with multi-BS coordination | This is transmitted only when multi-BS MIMO is operated |
| O | changeCount | | 8 | Change count in AAI_NBR-ADV for the following BS_index. | This is only transmitted only when diversitySetNum is higher than 0 |
| O | tempBsid-SET | bsidSet1 | 8 | tempBsidSET is composed of diversitySetNum number of BS_indices. Indicates diversity set members Refers to the ABS index of the AAI_NBR_ADV. Temp_BSID is derived from this BS_index. The Temp_BSID is the order of the ABSs in respect of the BS_index. Temp_BSID = 0 represents the ABS that is referred by the first BS_index in AAI_DL_IM message. | tempBsidSET is only transmitted only when diversitySetNum is higher than 0 |
| | tempBsid-SET | bsidSet2 | 8 | | |
| | tempBsid-SET | bsidSet3 | 8 | | |
| | tempBsid-SET | ... | 8 | | |
| | tempBsid-SET | bsidSet15 | 8 | | |
| | tempBsid-SET | bsidSet16 | 8 | | |

Referring to Table 1, the AAI_DL-IM message includes a diversitySetNum field that specifies the number of ABSs that is available in implementing a downlink multi-BS MIMO transmission mode, that is, the number of BSs included in the diversity set. The diversitySetNum field is 4 bits in length, thus representing up to 16 ABSs.

The AAI_DL-IM message also includes a tempBsid-SET field that specifies the indexes of the ABSs included in the diversity set. The indexes may be identical to 8-bit indexes used to identify the ABSs in an AAI_NBR-Adv message. The tempBsid-SET field may specify (or include) as many ABS indexes as the value of the diversitySetNum field (i.e. up to 16).

The 8-bit indexes set in the tempBsid-SET field may be re-indexed in a predetermined order. The resulting indexes are temporary BSIDs according to the present invention. Thus, a total of 16 ABSs are indicated by the tempBsid-SET field and the indexes of all the ABSs (i.e. the diversity set) are re-indexed in 4 bits. The AMS may acquire temporary BSIDs implicitly in this manner.

A temporary BSID according to the present invention is half the size of an 8-bit index used to identify an ABS in the AAI_NBR-ADV message. Thus, if temporary BSIDs are used in MAC messages used to request or feedback in relation to the downlink multi-BS MIMO transmission mode, the size of a BS list included in the MAC messages is decreased to a half.

Now a description will be made of an operation for acquiring temporary BSIDs at an AMS and an operation for using temporary BSIDs with reference to FIG. 5.

Figure 5:
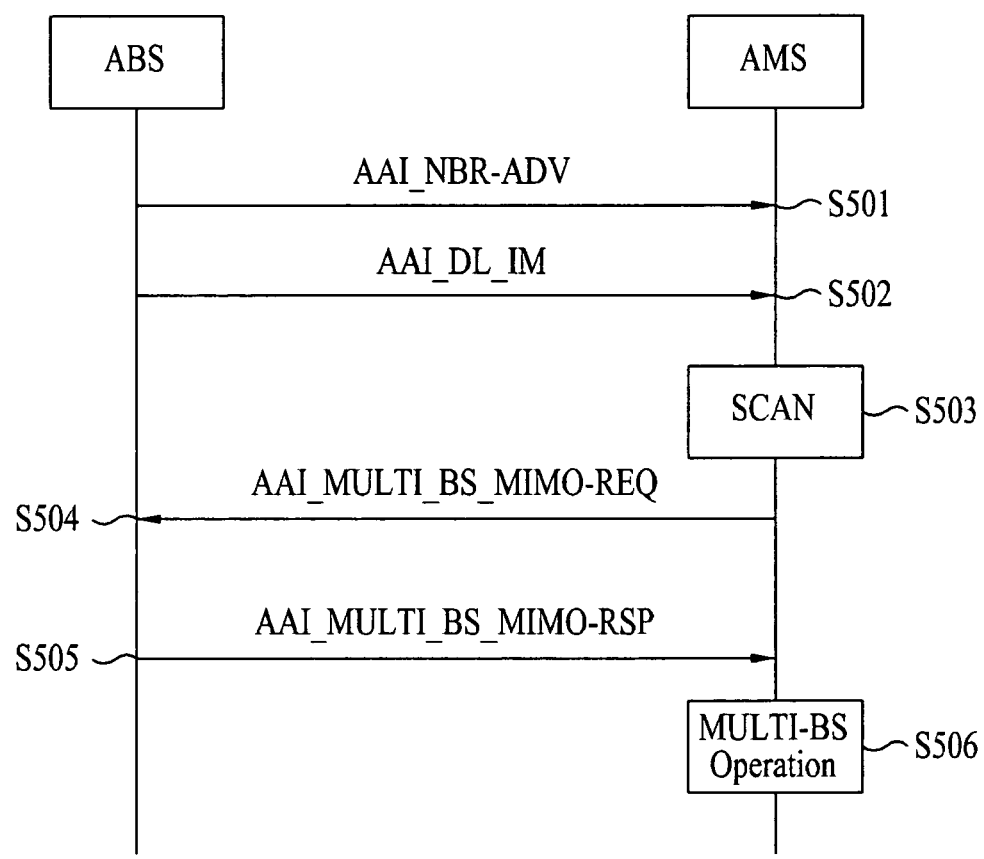
FIG. 5 is a diagram illustrating a signal flow for an operation for acquiring temporary BS Identifiers (IDs) and requesting a downlink multi-BS MIMO transmission mode according to an exemplary embodiment of the present invention.

FIG. 5 is a diagram illustrating a signal flow for an operation for acquiring temporary BSIDs and requesting a downlink multi-BS MIMO transmission mode according to an embodiment of the present invention.

Referring to FIG. 5, the AMS may acquire system information about neighbor ABSs by receiving an AAI_NBR-ADV message broadcast from the serving ABS in step S501.

As stated before, the AAI_NBR-ADV message includes 48-bit full BSIDs of neighbor BSs, which may be distinguished by 8-bit indexes (i.e. ABS indexes) within the message.

In step S502, the AMS may receive an AAI_DL-IM message broadcast by the serving ABS and acquire temporary BSIDs from the AAI_DL-IM message implicitly in the manner described above with reference to Table 1.

Each of the AAI_NBR-ADV message and the AAI_DL-IM message includes a change count. Thus the AMS may determine by comparing change count values whether the versions of the AAI_NBR-ADV message and the AAI_DL-IM message are identical. If the change counts are different, the 8-bit ABS indexes of the AAI_NBR-ADV message may indicate different neighbor ABSs from actual neighbor ABSs. Also, the AAI_DL-IM message which refers to 8-bit ABS indexes of an AAI_NBR-ADV message may indicate different diversity set members from actual diversity set members. As a consequence, ABSs indicated by temporary BSIDs acquired using the diversity set included in the AAI_DL-IM message may be different from actual ABSs. In this case, the AMS preferably waits until acquiring two messages of the same change count.

Subsequently, the AMS may determine the channel state between the AMS and each ABS included in the diversity set by scanning the ABSs of the diversity set using information included in the two messages in step S503.

For the scanning, the AMS may use the system information about the neighbor ABSs included in the AAI_NBR-ADV message. In step S504, the AMS may transmit a message requesting a downlink multi-BS MIMO transmission mode, namely an AAI_MULTI_BS_MIMO-REQ message to the serving ABS according to the determined channel states.

Table 2 below illustrates an example of information included in the AAI_MULTI_BS_MIMO-REQ message.

TABLE 2

| M/O | Attributes/Array of attributes | Size (bits) | Value/Note | Conditions |
|---|---|---|---|---|
| M | Control Message Type | 8 | Type of AAI_MULTI_BS_MIMO-REQ | NA |
| M | multiBsMimoRequest | 1 | 0b0: Single-BS precoding with Multi-BS Coordination<br>0b1: Multi-BS Joint MIMO Processing | NA |
| O | nipValueForSingleBS | 2 | NIP value encoded as difference to NIP_th_1 when multiBsMimoRequest = 0b0. The value shall be interpreted as unsigned 2 bits with units of 0.5 dB, 0b00 is interpreted as NIP_th1 and 0b11 is interpreted as NIP_th1 + 1.5 dB or higher | Present when multiBsMimoRequest = 0b0 |
| O | numbs | 3 | Number of base station which exceeds threshold | Present when multiBsMimoRequest = 0b0 |
| O | tempBsid | 4 | This represents Temp_BSID. Temp_BSID is broadcasted through AAI_DL_IM message | Present when multiBsMimoRequest = 0b0 |
| O | bitmapForRequestedAdjABSs | 8 | Each bit in this bitmap represents one ABS and the i-th bit (i = 1, °¶, 8) represents the neighboring ABS (listed in AAI-DL-IM message) with the i-th strongest channel to the AMS. Please refer 16.5.1.4. | Present when multiBsMimoRequest = 0b1 |
| O | nipValueForJoint | 2 | Sum NIP value encoded as difference to NIP_th_2 when multiBsMimoRequest = 0b1. The value shall be interpreted as unsigned 2bits with units of 0.5 dB, 0b00 is interpreted as NIP_th2 and 0b11 is interpreted as NIP_th2 + 1.5 dB or higher | Present when multiBsMimoRequest = 0b1 |

Referring to Table 2, the AAI_MULTI_BS_MIMO-REQ message includes a Multi-BS MIMO Request field that indicates an AMS-requested downlink multi-BS MIMO transmission mode.

A NumBS field may specify the number of ABSs with channel measurements exceeding a predetermined threshold among the ABSs included in the diversity set. A Temp_BSID field may provide the temporary BSIDs of the ABSs with channel measurements exceeding the predetermined threshold.

The serving ABS may determine a final diversity set including ABSs that will participate in the AMS-requested multi-BS MIMO transmission mode based on the information about the ABSs in the received AAI_MULTI_BS_MIMO-REQ message and transmit the final diversity set through an AAI_MULTI_BS_MIMO-RSP message in step S505.

Table 3 illustrates an example of information included in the AAI_MULTI_BS_MIMO-RSP message.

TABLE 3

| M/O | Attributes/Array of attributes | Size (bits) | Value/Note | Conditions |
|---|---|---|---|---|
| M | Control Message Type | 8 | Type of AAI_MULTI_BS_MIMO-RSP | NA |
| M | adjAbsBitmapMultiBSMIMO | 8 | 0: ABS is not involved in multiBS MIMO<br>1: ABS is involved in multiBS MIMO<br>Each bit in this bitmap represents one ABS and the i-th bit (i = 1~8) represents the neighboring ABS (listed in AAI-DL-IM message) with the i-th strongest channel to the AMS. | NA |

Referring to Table 3, the AAI_MULTI_BS_MIMO-RSP message may include a adjABSBitmapMultiBS_MIMO field. This field provides a bitmap specifying ABSs that will be involved in the AMS-requested multi-BS MIMO transmission mode among the ABSs included in the AAI_DL-IM message. In step S506, the AMS may receive data from the ABSs indicated by the bitmap set in the AAI_MULTI_BS_MIMO-RSP message in the multi-BS MIMO transmission mode.

Meanwhile, temporary BSIDs according to the present invention may be used in a MAC message by which the AMS transmits feedback information to the serving ABS in the multi-BS MIMO transmission mode, which will be described with reference to FIG. 6.

Figure 6:
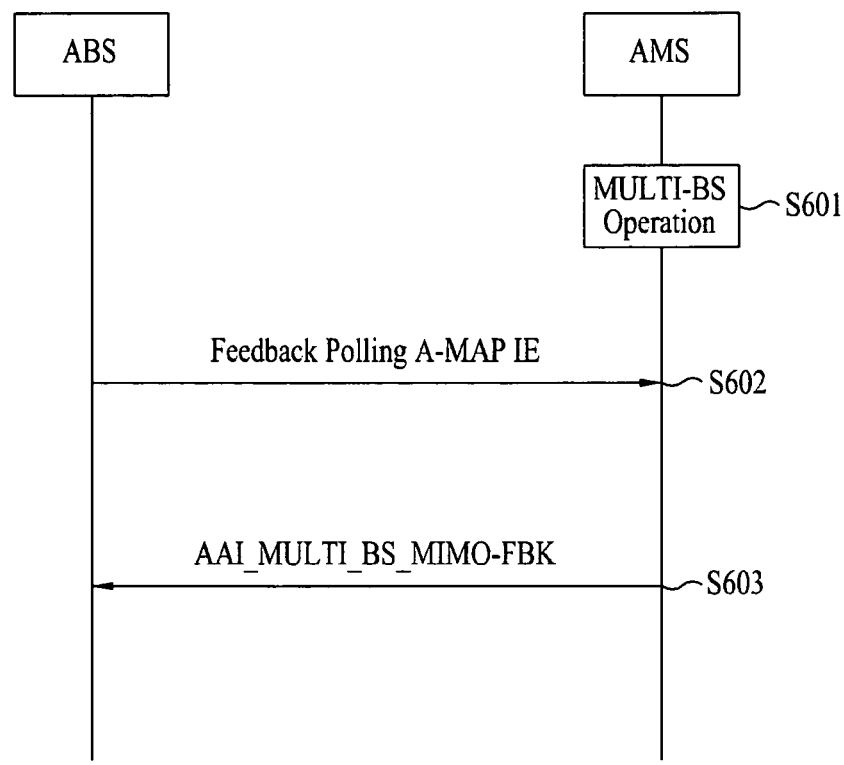
FIG. 6 is a diagram illustrating a signal flow for a feedback operation of a Mobile Station (MS) in a downlink multi-BS MIMO transmission mode according to an exemplary embodiment of the present invention.

FIG. 6 is a diagram illustrating a signal flow for a feedback operation of an AMS in a multi-BS MIMO transmission mode according to an embodiment of the present invention.

Referring to FIG. 6, the AMS may operate in a multi-BS MIMO transmission mode by a procedure similar to steps S501 to S505 of FIG. 5 in step S601.

In step S602, the AMS may receive a feedback request concerning a multi-BS MIMO operation state from the serving ABS. The serving ABS may use a Feedback Polling Advanced-MAP Information Element (A-MAP IE) to request feedback information.

Upon receipt of the feedback information request, the AMS may transmit feedback information to the serving ABS by an AAI_MultiBS_MIMO_FBK message in step S603.

Table 4 below illustrates an example of information included in the AAI_MultiBS_MIMO_FBK message.

TABLE 4

| Syntax | Size (bit) | Notes |
|---|---|---|
| AAI_MultiBS_MIMO_FBK_Message_Format { | | |
| MAC Control Message Type = xx | | |
| if (ICT ==0b10 or b11){ | | Co-MIMO or CL-MD |
|     CQI | 4 | |
| } | | |
| for (i = 1; i < = N multiBS reports; i++) { | | |
|     if (ICT = 0b0)or 0b01){ | | |
|         Temp_BSID | 4 | Diversity set member ID |
|     } | | |
|     PMI | Variable | PMI from the rank-1 base codebook or base codebock subset<br>$N_t$ = 2: 3 bits<br>$N_t$ = 4: 4 bits<br>$N_t$ = 8: 4 bits |
|     If (ICT==0b00 or 0b01) { | | |
|         Additional measurement metric | 2 | SINR gain assuming the reported PMI set is coordinated. This can be used for resolving conflict from multiple AMS.<br>0b00: 0.25 dB<br>0b01: 0.50 dB<br>0b10: 1.00 dB<br>0b11: above 1.50 dB |
|         PMI_subset_size | 1 | Indication whether 1 PMI or a PMI set is feedback<br>0b0: 1 PMI<br>0b1: multiple PMIs |
|         If (PMI_Subset_size = 0b1){ | | |
|             PMI_coordination_subset | 1 | Set of PMIs from the rank-1 base codebook or base codebook subset<br>0b0: correlation level n1 (as defined in section 165.1.2.1)<br>0b1: correlation level n2 (as defined in section 165.1.2.1) |
|         } | | |
|     } | | |
|     If (ICT==0b10 or 0b11 ) { | | ICT is defined in Feedback Polling A-MAP IE |
|         CPMI | 3 | Concatenating PMI for neighboring cells. |

TABLE 4-continued

| Syntax | Size (bit) | Notes |
|---|---|---|
|    } } } | | |

Referring to Table 4, the AAI_MultiBS_MIMO_FBK message may include a Channel Quality Indicator (CQI) field, a PMI field, and a Temp_BSID field. The Temp_BSID field may specify the temporary BSIDs of ABSs that are involved in the multi-BS MIMO transmission mode among diversity set members.

Structures of AMS and ABS

Now a description will be made of an AMS and an ABS (Femto BS (FBS) or Macro BS (MBS)) for implementing the above-described exemplary embodiments of the present invention according to an exemplary embodiment of the present invention.

The AMS operates as a transmitter on an uplink and as a receiver on a downlink, whereas the ABS operates as a receiver on the uplink and as a transmitter on the downlink. Therefore, each of the AMS and the ABS may have a transmitter and a receiver for transmitting and receiving information or data.

Each of the transmitter and the receiver may include a processor, modules, parts and/or means for performing the exemplary embodiments of the present invention. Particularly, the transmitter and the receiver may include modules (or means) for encrypting messages, modules for interpreting encrypted messages, and antennas for transmitting and receiving messages. An example of the transmitter and the receiver will be described with reference to FIG. 7.

Figure 7:
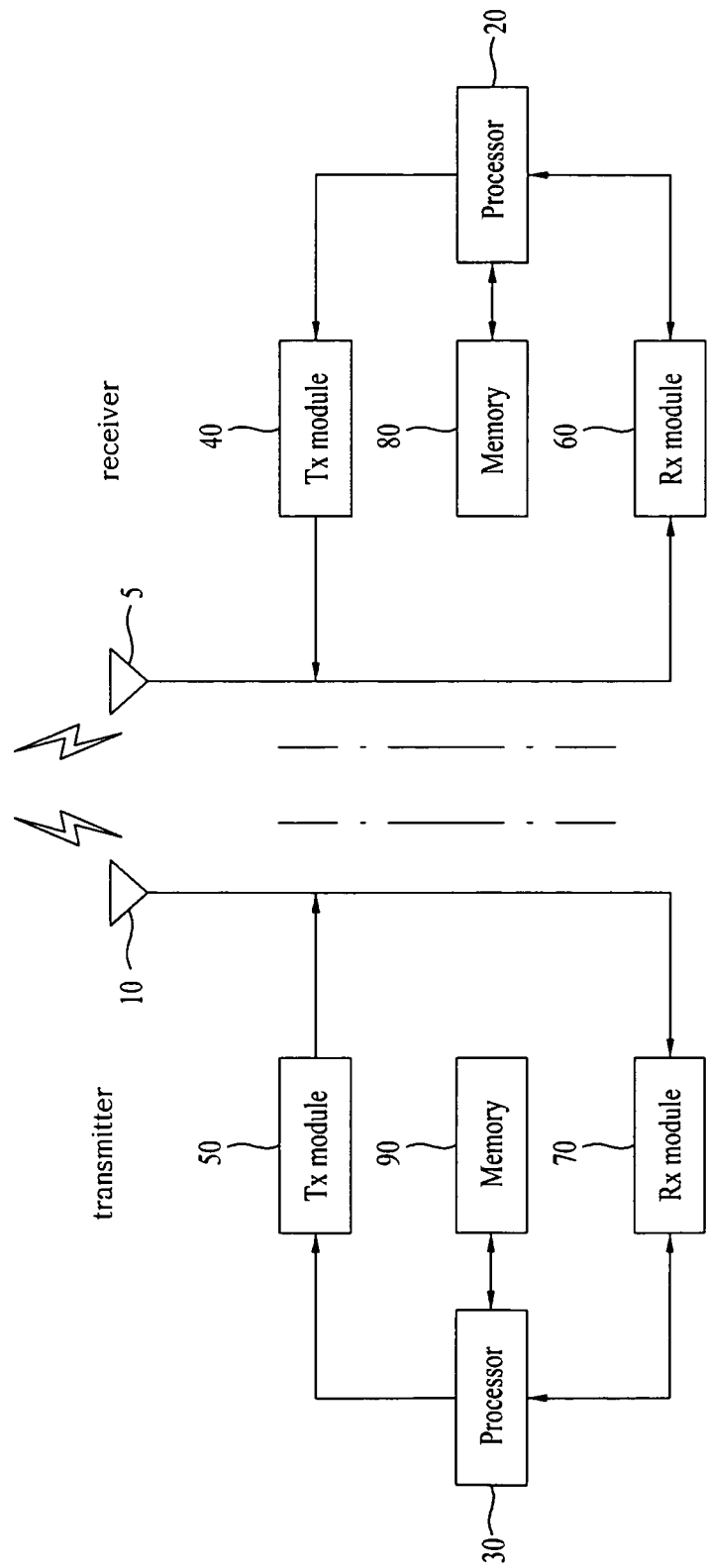
FIG. 7 is a block diagram of a transmitter and a receiver according to an exemplary embodiment of the present invention.

FIG. 7 is a block diagram of a transmitter and a receiver according to an exemplary embodiment of the present invention.

Referring to FIG. 7, the structures of the transmitter and the receiver are illustrated on the left and right sides of FIG. 8, respectively. Each of the receiver and the transmitter may include an antenna 5 or 10, a processor 20 or 30, a Transmission (TX) module 40 or 50, a Reception (Rx) module 60 or 70, and a memory 80 or 90. Each component of the transmitter operates in correspondence with its counterpart of the receiver.

The antennas 5 and 10 transmit Radio Frequency (RF) signals generated from the Tx modules 40 and 50 in the air interface, or receive RF signals in the air interface and output the received RF signals to the Rx modules 60 and 70. When MIMO is supported, two or more antennas may be used.

An antenna, a Tx module and an Rx module may collectively form an RF module.

The processors 20 and 30 provide overall control to the AMS. For example, the processors 20 and 30 may perform a control function, a MAC frame conversion control function based on service characteristics and propagation environments, a handover function, authentication, and encryption in order to perform the afore-described exemplary embodiments. More specifically, the processors 20 and 30 may provide overall control to perform the above-described multi-BS MIMO operation.

Especially a processor of the AMS may acquire a change count, BSIDs of neighbor ABSs, and the 8-bit indexes of the BSIDs from an AAI_NBR-ADV message broadcast from a serving ABS.

In addition, the processor of the AMS may receive an AAI_DL-IM message broadcast from the serving ABS and acquire temporary BSIDs (Temp_BSID) from a BS list (i.e. a diversity set) that may be involved in a multi-BS MIMO transmission mode by implicit indexing. The processor of the AMS may request a multi-BS MIMO transmission mode based on the acquired information and report ABSs in channel states exceeding a predetermined threshold to the serving ABS by use of the temporary BSIDs of the ABSs in an AAI_MULTI_BS_MIMO-REQ message.

Then the processor of the AMS may be aware of ABSs that will be involved in the multi-BS MIMO transmission mode, determined by the serving ABS, from an AAI_MULTI_BS_MIMO-RSP message.

The processor provides an overall control to operations that are performed according to the exemplary embodiments of the present invention described with reference to FIGS. 5 and 6.

The Tx modules 40 and 50 may transmit data scheduled by the processors 20 and 30 to the antennas 5 and 10, after a predetermined coding and modulation.

The Rx modules 60 and 70 may recover original data by decoding and demodulating RF signals received through the antennas 5 and 10 over the air interface and output the original data to the processors.

The memories 80 and 90 may store programs for processing and control operations of the processors 20 and 30 and temporarily store input/output data (e.g. scanning results or a neighbor list). Also, the memories 80 and 90 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Read-Only Memory (ROM), an Electrically Erasable Programmable Read-Only Memory (EE-PROM), a Programmable Read-Only Memory (PROM), a magnetic memory, a magnetic disc, and optical disk.

The ABS may perform, in at least one of the above-described modules or in a separately procured means, module or part, a control function according to the embodiments of the present invention, an Orthogonal Frequency Division Multiple Access (OFDMA) packet scheduling, Time Division Duplex (TDD) packet scheduling, channel multiplexing, a variable MAC frame control function based on service characteristics and a propagation environment, a real-time high-speed traffic control function, a handover function, an authentication and encryption function, a packet modulation and demodulation function for data transmission and reception, a high-speed packet channel coding function, and a real-time modem control function.

What is claimed is:

1. A method for performing a multi-Base Station (BS) Multiple Input Multiple Output (MIMO) operation at a Mobile Station (MS) in a broadband wireless access system, the method comprising:

receiving a first broadcast message including system information about a plurality of neighbor BSs from a serving BS;

receiving a second broadcast message including BS set information from the serving BS, the BS set information including indexes of one or more BSs coordinating with the serving BS for the multi-BS MIMO operation among the plurality of neighbor BSs indicated by the first broadcast message;

determining a temporary BS Identifier (ID) of each of the BSs included in the BS set information using the indexes included in the second broadcast message; and transmitting a request message to the serving BS, the request message including a request field that indicates a multi-BS MIMO transmission mode requested by the MS and at least one of the determined temporary BS IDs.

2. The method according to claim 1, wherein the temporary BS ID determination comprises re-indexing the indexes in an order the indexes listed in the BS set information.

3. The method according to claim 1, wherein each of the indexes is 8 bits long, and each of the temporary BS IDs is 4 bits long.

4. The method according to claim 1, further comprising measuring a channel from each of the BSs included in the BS set information using the system information included in the first broadcast message, wherein each of the at least one of the determined temporary BS IDs included in the request message corresponds to a BS having a channel measurement larger than a predetermined threshold among the BSs included in the BS set information.

5. A method for performing a multi-Base Station (BS) Multiple Input Multiple Output (MIMO) operation at a serving BS in a broadband wireless access system, the method comprising:

broadcasting a first broadcast message including system information about a plurality of neighbor BSs;

broadcasting a second broadcast message including BS set information, the BS set information including indexes of at least one neighbor BS coordinating with the serving BS for the multi-BS MIMO operation among the plurality of neighbor BSs indicated by the first broadcast message; and receiving a request message requesting multi-BS MIMO transmission from a Mobile Station (MS), the request message including a request field that indicates a multi-BS MIMO transmission mode requested by the MS.

6. The method according to claim 5, wherein when the request field is set to a value indicating Single-BS precoding with Multi-BS Coordination, the request message further includes temporary BS Identifiers (IDs) determined for BSs included in the BS set information using the indexes, and Wherein the temporary BS IDs are determined by re-indexing the indexes in an order the indexes listed in the BS set information.

7. The method according to claim 6, wherein each of the indexes is 8 bits long, and each of the temporary BS IDs is 4 bits long.

8. The method according to claim 5, wherein when the request field is set to a value indicating Multi-BS Joint MIMO Processing, further comprising transmitting a response message to the MS, the response message including a bitmap indicating which of the neighbor BSs included in the BS set information are involved in the multi-BS MIMO operation.

9. A Mobile Station (MS) comprising:
a processor; and
a Radio Frequency (RF) module having a plurality of antennas, for transmitting and receiving RF signals to and from an external device under the control of the processor, wherein the processor controls a first broadcast message including system information about a plurality of neighbor Base Stations (BSs) to be received from a serving BS, controls a second broadcast message including BS set information to be received from the serving BS, the BS set information including indexes of one or more neighbor BSs coordinating with the serving BS for multi-Base Station (BS) Multiple Input Multiple Output (MIMO) operation among the plurality of neighbor BSs indicated by the first broadcast message, controls a temporary BS Identifier (ID) of each of the BSs included in the BS set information to be determined using the indexes included in the second broadcast message, and controls a request message to be transmitted to the serving BS, the request message including a request field that indicates a multi-BS MIMO transmission mode requested by the MS and at least one of the determined temporary BS IDs.

10. The MS according to claim 9, wherein the processor determines the temporary BS IDs by re-indexing the indexes in an order the indexes listed in the BS set information.

11. The MS according to claim 9, wherein each of the indexes is 8 bits long, and each of the temporary BS IDs is 4 bits long.

12. The MS according to claim 9, wherein the processor further controls a channel from each of the BSs included in the BS set information to be measured using the system information included in the first broadcast message, and wherein each of the at least one of the determined temporary BS IDs included in the request message corresponds to a BS having a channel measurement larger than a predetermined threshold among the BSs included in the BS set information.

13. A Base Station (BS) comprising:
a processor; and
a Radio Frequency (RF) module having a plurality of antennas, for transmitting and receiving RF signals to and from an external device under the control of the processor, wherein the processor controls a first broadcast message including system information about a plurality of neighbor BSs to be broadcast, controls a second broadcast message including BS set information to be broadcast, and controls a request message requesting multi-BS Multiple Input Multiple Output (MIMO) transmission from a Mobile Station (MS) to be received, wherein the request message includes a request field that indicates a multi-BS MIMO transmission mode requested by the MS, and wherein the BS set information includes indexes of at least one neighbor BS coordinating with a serving BS for a multi-BS MIMO operation among the plurality of neighbor BSs indicated by the first broadcast message.

14. The BS according to claim 13, wherein when the request field is set to a value indicating Single-BS precoding with Multi-BS Coordination, the request message further includes temporary BS Identifiers (IDs) determined for BSs included in the BS set information using the indexes, and wherein the temporary BS IDs are determined by re-indexing the indexes in an order the indexes listed in the BS set information.

15. The BS according to claim 14, wherein each of the indexes is 8 bits long, and each of the temporary BS IDs is 4 bits long.

16. The BS according to claim 13, wherein when the request field is set to a value indicating Multi-BS Joint MIMO Processing, the processor controls a response message to be transmitted to the MS, and wherein the response message includes a bitmap indicating which of the neighbor BSs included in the BS set information are involved in the multi-BS MIMO operation.

\* \* \* \* \*